US007464638B2

(12) United States Patent
Tremblay

(10) Patent No.: US 7,464,638 B2
(45) Date of Patent: Dec. 16, 2008

(54) REUSABLE BEVERAGE FILTER

(76) Inventor: Christian Tremblay, 985 Tousignant, Trois-Rivières, Quebec (CA) G8V 2R7

( * ) Notice: Subject to any disclaimer, the term of this patent is extended or adjusted under 35 U.S.C. 154(b) by 0 days.

(21) Appl. No.: 11/656,180

(22) Filed: Jan. 22, 2007

(65) Prior Publication Data
US 2007/0163447 A1  Jul. 19, 2007

Related U.S. Application Data

(63) Continuation-in-part of application No. 11/259,410, filed on Oct. 26, 2005, now abandoned.

(51) Int. Cl.
*A47J 1/00* (2006.01)
(52) U.S. Cl. .............................. 99/323; 99/317; 99/321; 210/464; 210/469; 210/473; 210/482
(58) Field of Classification Search ................... 99/275, 99/495, 279–323, 452; 210/469, 470, 474, 210/455, 477–481, 490.01, 492.2, 238, 482, 210/709, 112, 143, 346, 486, 464, 473; D7/400, D7/401
See application file for complete search history.

(56) References Cited

U.S. PATENT DOCUMENTS

| D253,082 | S | * | 10/1979 | Moncrief | ...................... D7/400 |
| 4,867,880 | A | * | 9/1989 | Pelle et al. | .................. 210/474 |
| 5,043,172 | A | * | 8/1991 | Loizzi | .......................... 426/77 |
| D333,755 | S | * | 3/1993 | Oleksiuk | ...................... D7/400 |
| 5,852,966 | A | * | 12/1998 | Hursh | .......................... 99/323 |
| 2003/0000887 | A1 | * | 1/2003 | Zaske | .......................... 210/464 |

* cited by examiner

*Primary Examiner*—Timothy F. Simone
(74) *Attorney, Agent, or Firm*—Eric Fincham

(57) ABSTRACT

A reusable beverage filter such as used in brewing coffee, the filter having an upper portion and a lower portion, a sieve portion between the upper and lower portions, the upper portion having a flexible portion with a plurality of undulations formed therein such that the filter may fit different size brewing baskets.

9 Claims, 5 Drawing Sheets

REUSABLE BEVERAGE FILTER

FIELD OF THE INVENTION

This application is a Continuation-In-Part of application Ser. No. 11/259,410 filed Oct. 26, 2005, now abandoned.

The present invention relates to coffee makers, and more particularly, relates to coffee filters which may be used repeatedly without changing the filtering medium.

BACKGROUND OF THE INVENTION

The practice of brewing coffee (and tea) is well known in the art. Many coffee makers exist which utilize disposable filter papers. While the disposable filter papers achieve a satisfactory performance, they must continually be replaced with the expense inherent thereto.

Reusable coffee filters are also well known in the art. Such filters, normally in the form of a sieve, are placed within a supporting structure and ground coffee (or tea) is placed within the reusable filter.

While such reusable filters are known, generally separate filters must be provided for each different size of coffee maker. Furthermore, one has the trade off that if a very fine mesh size is used, the filtering time is increased. Conversely, a larger mesh size can result in coffee grinds being in the brewed coffee.

SUMMARY OF THE INVENTION

It is an object of the present invention to provide an improved reusable coffee filter overcoming some of the disadvantages of the prior art.

According to one aspect of the present invention, there is provided a reusable beverage filter comprising a base, an upper support ring, the upper support ring having at least one flexible portion, the flexible portion having a plurality of undulations formed therein and a sieve extending between the upper support ring and the base, the sieve having undulations in a section secured to the flexible portion of the upper support ring having undulations formed therein.

The reusable beverage filter of the instant invention is suitable for use in beverage makers designed to receive such a reusable filter. In this regard, the filter can be adapted for most existing beverage brewers on the market.

The reusable filter of the present invention may come in either of two forms utilized in the industry. Thus, it may be provided in a conical form or alternatively, in a frustraconical configuration.

As set forth above, the reusable beverage filter will include "a frame" which comprises a bottom base member and an upper ring member. Preferably, both the base member and the upper ring member are formed of a suitable plastic material, though not necessarily the same material.

The upper ring member, which may be formed of one or more components, has an undulating portion; this undulating portion is formed where the ring member is formed of a flexible material such that the ring can be adjusted in size. Preferably, at least a pair of such undulating portions are provided while, in one embodiment, the entire ring section is of an undulating configuration.

In preferred embodiments of the invention, the upper ring member and the base are connected together by rib like members extending therebetween.

Extending between the base and the upper ring is the filter portion which is essentially a mesh or a sieve. The sieve will likewise have undulations in that portion which is connected to the undulated upper ring portion. Again, in certain embodiments, the entire sieve portion may be of an undulating configuration.

The sieve may be formed of any suitable material known to those skilled in the art and generally will be either a plastic or metallic material. A preferred material is a stainless steel metallic material in the form of a plurality of fine wires slightly spaced apart. Preferably, the wires are between 140 to 170 lines per inch. In this embodiment, the openings or perforations would be in the order of 5 to 7 mm.

The beverage filter of the present invention will preferably include a central handle portion extending upwardly from the base and which handle portion may be gripped when removing the filter.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
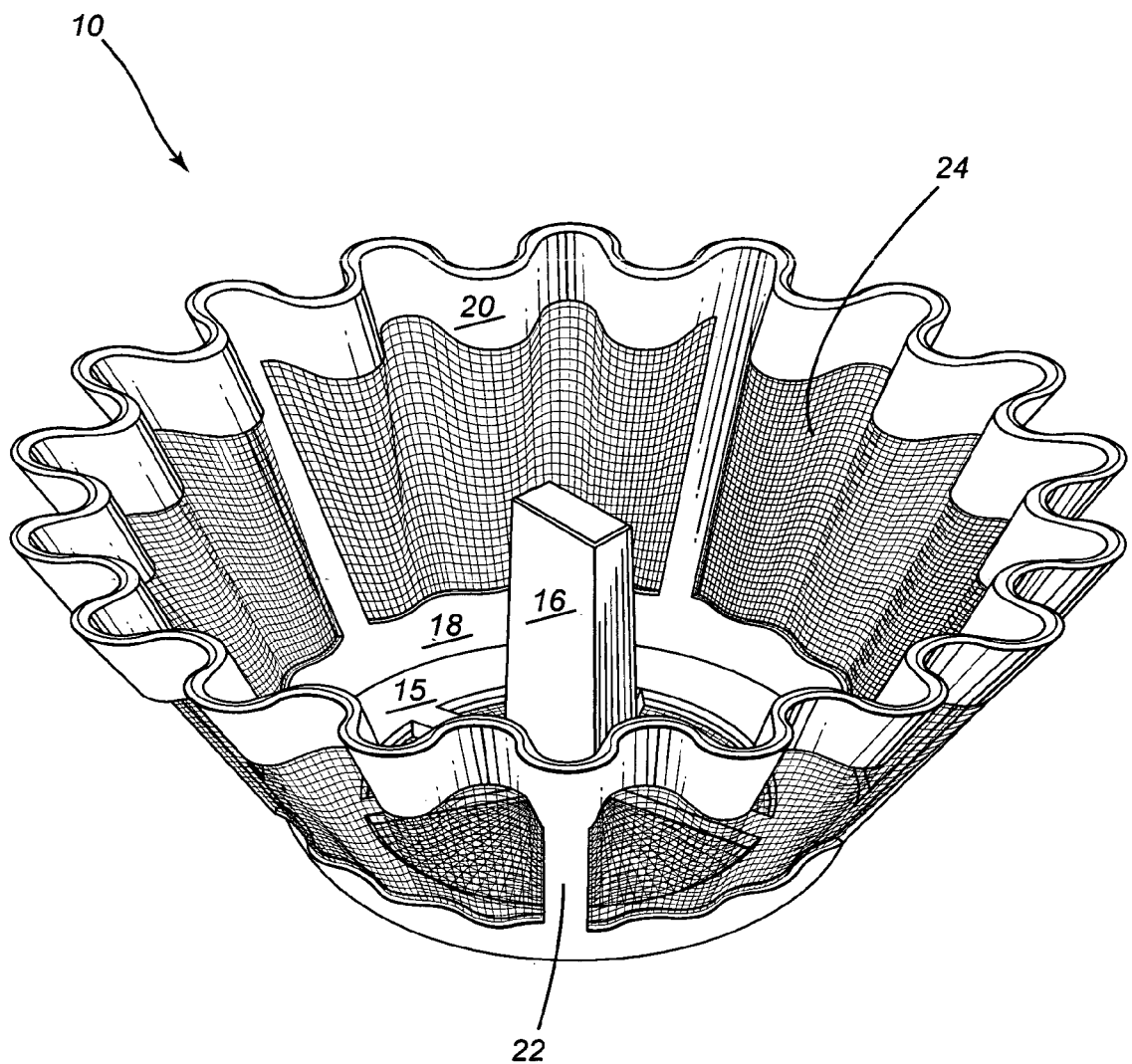
FIG. 1 is a perspective view, of a first embodiment of a beverage filter according to the present invention.

Referring to the drawings in greater detail and by reference characters thereto, there is illustrated in FIG. 1 a beverage filter which is generally designated by reference numeral 10. Beverage filter 10 is of the type generally referred to as a basket filter. Beverage filter 10 has a central base portion 12 with a plurality of ribs 14 extending outwardly therefrom. Ribs 14 are connected to an outer generally circular base portion 15.

Extending upwardly from outer base portion 15 is a lower wall portion 18. An upper wall section 20 which is formed of a solid non porous material is connected to a solid non porous lower wall section 18 by means of ribs 22. A handle 16 extends upwardly from central base portion 12.

Figure 2:
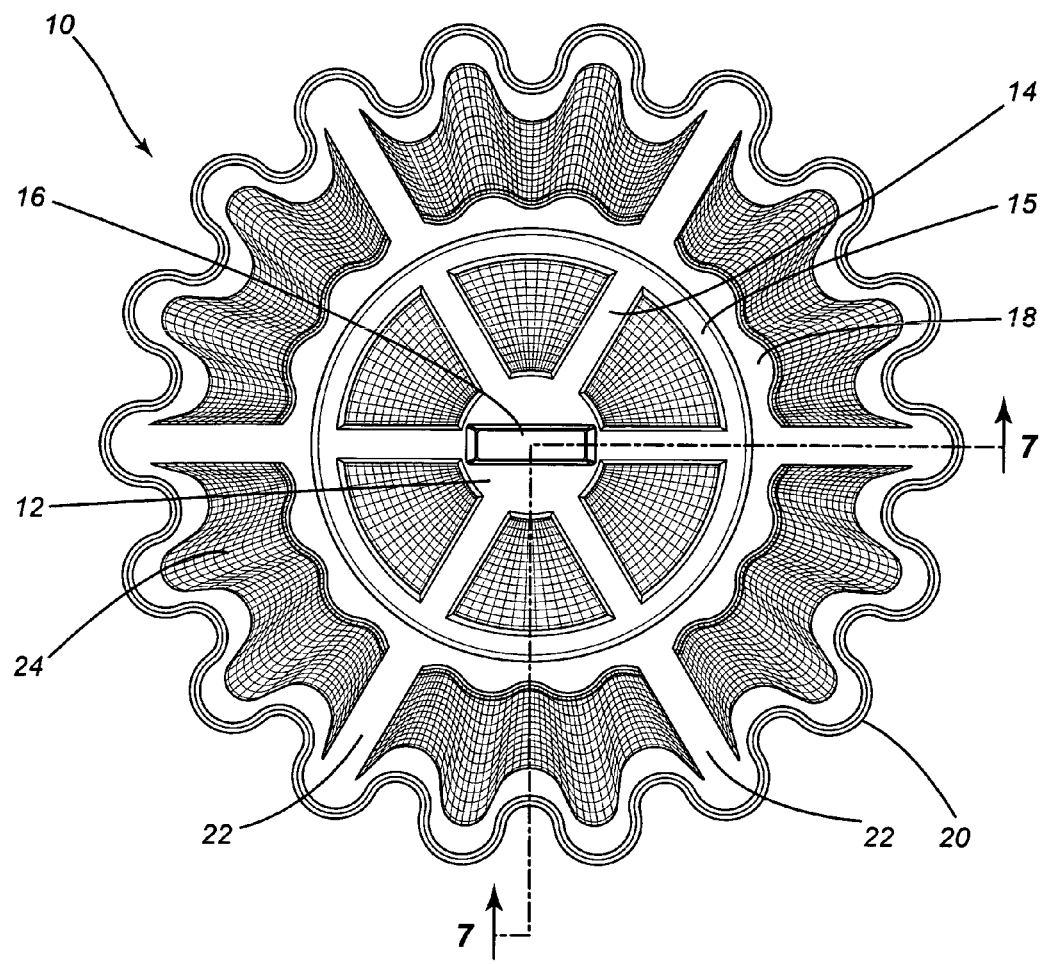
FIG. 2 is a top plan view thereof.
Figure 3:
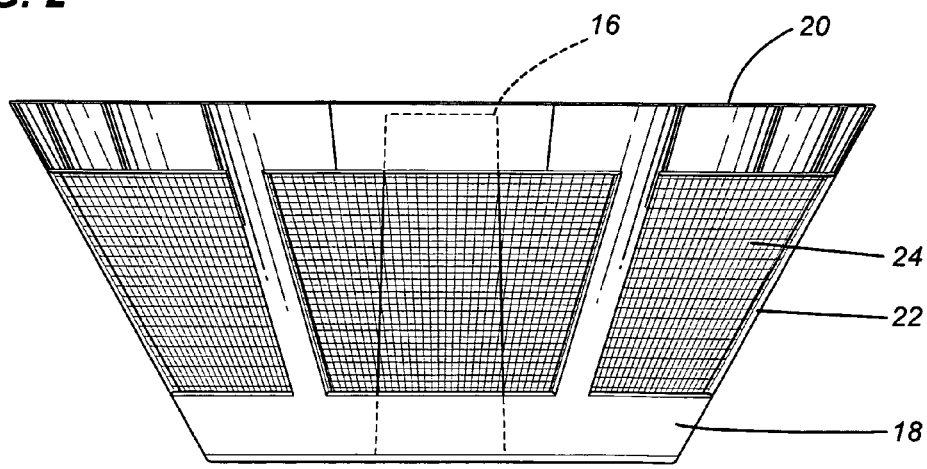
FIG. 3 is a side elevational view thereof.

As will be seen in FIGS. 1 and 2, upper wall section 20 is undulated and is formed of a sufficiently flexible material that the beverage filter 10 can be sized to fit different size baskets. A sieve or a mesh 24 extends about both the base and side wall to provide the filtering capability.

Figure 4:
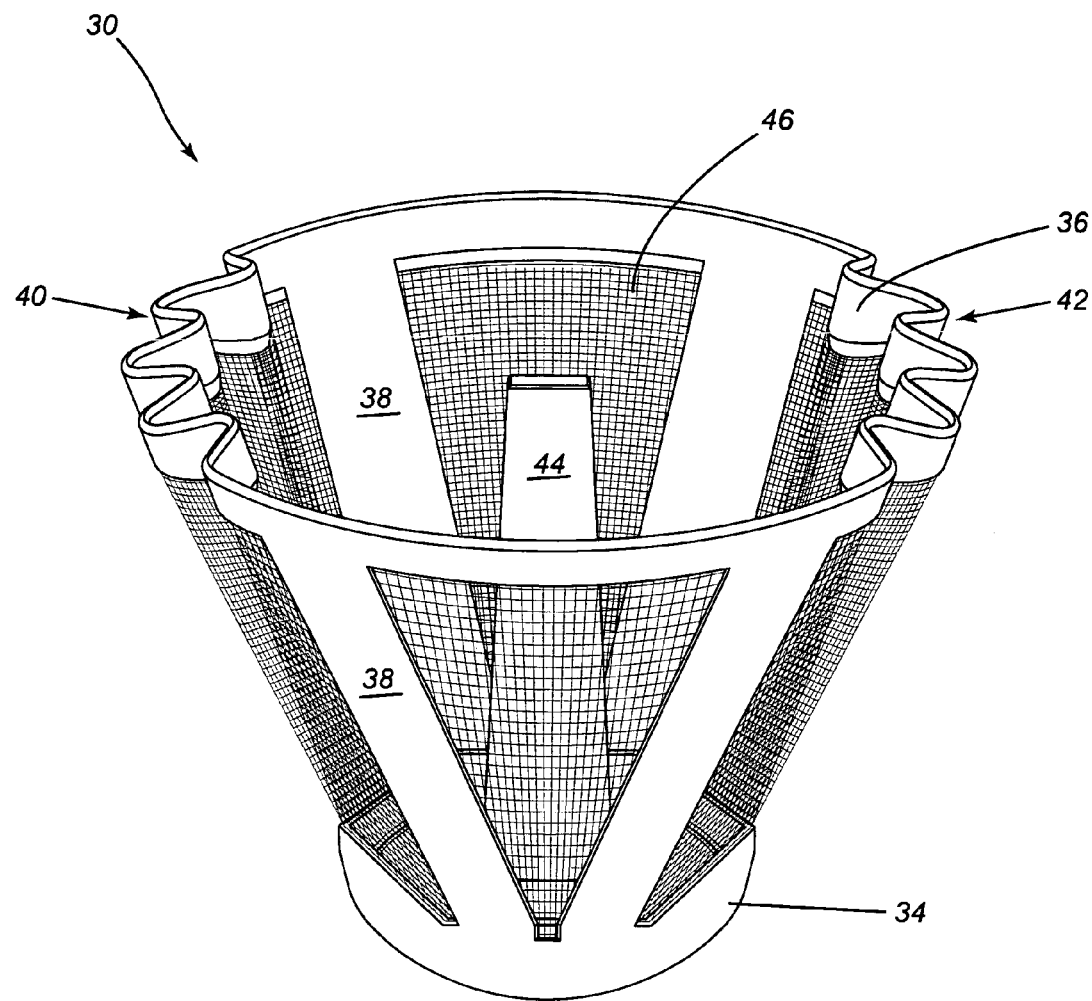
FIG. 4 is a perspective view of a second embodiment of a beverage filter according to the present invention.
Figure 5:
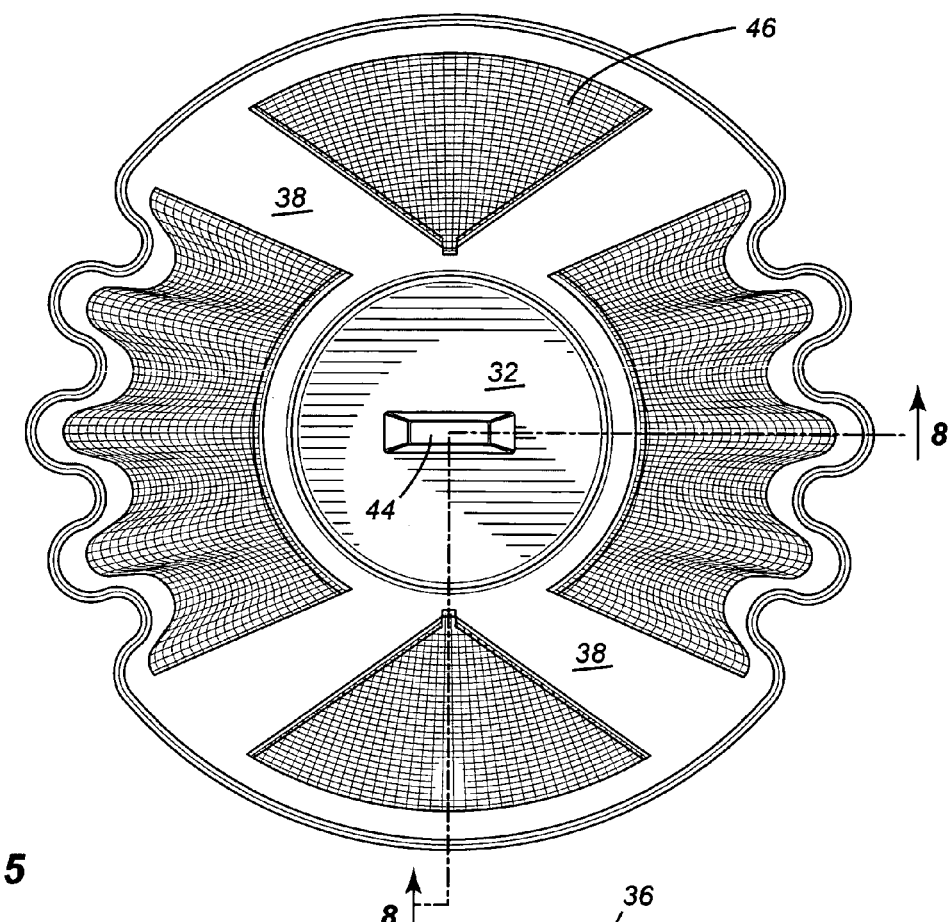
FIG. 5 is top plan view thereof.
Figure 6:
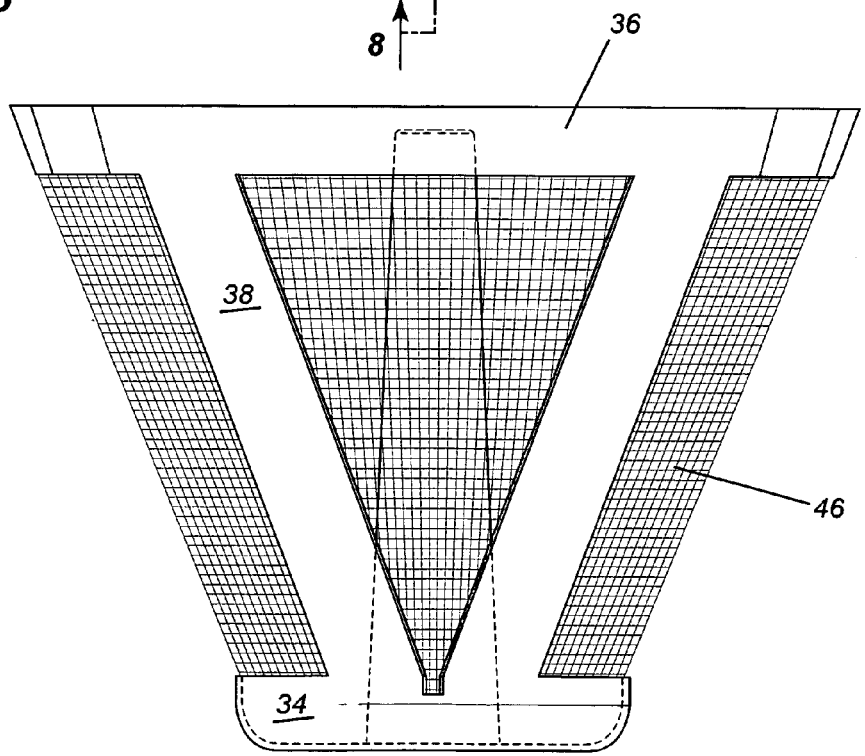
FIG. 6 is a side elevational view thereof.
Figure 7:
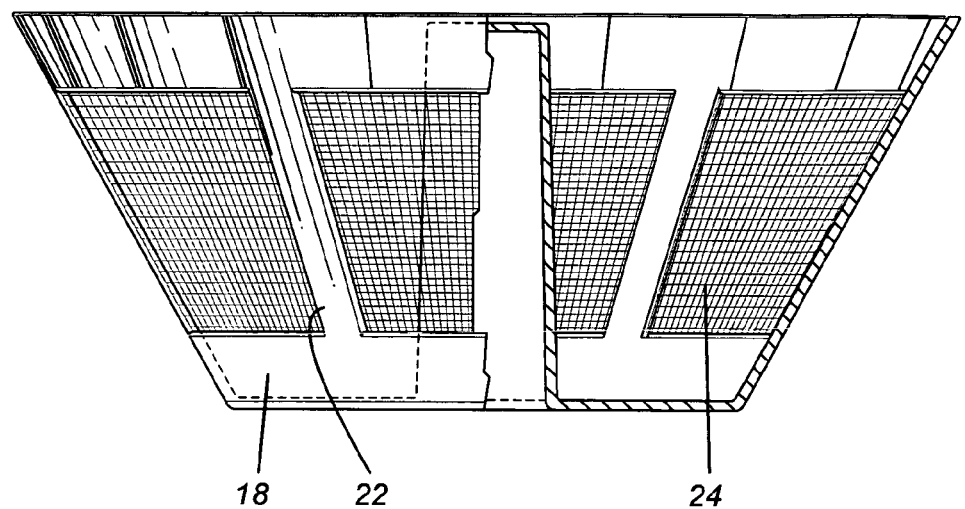
FIG. 7 is a cross sectional view taken along the lines 7-7 of FIG. 2.
Figure 8:
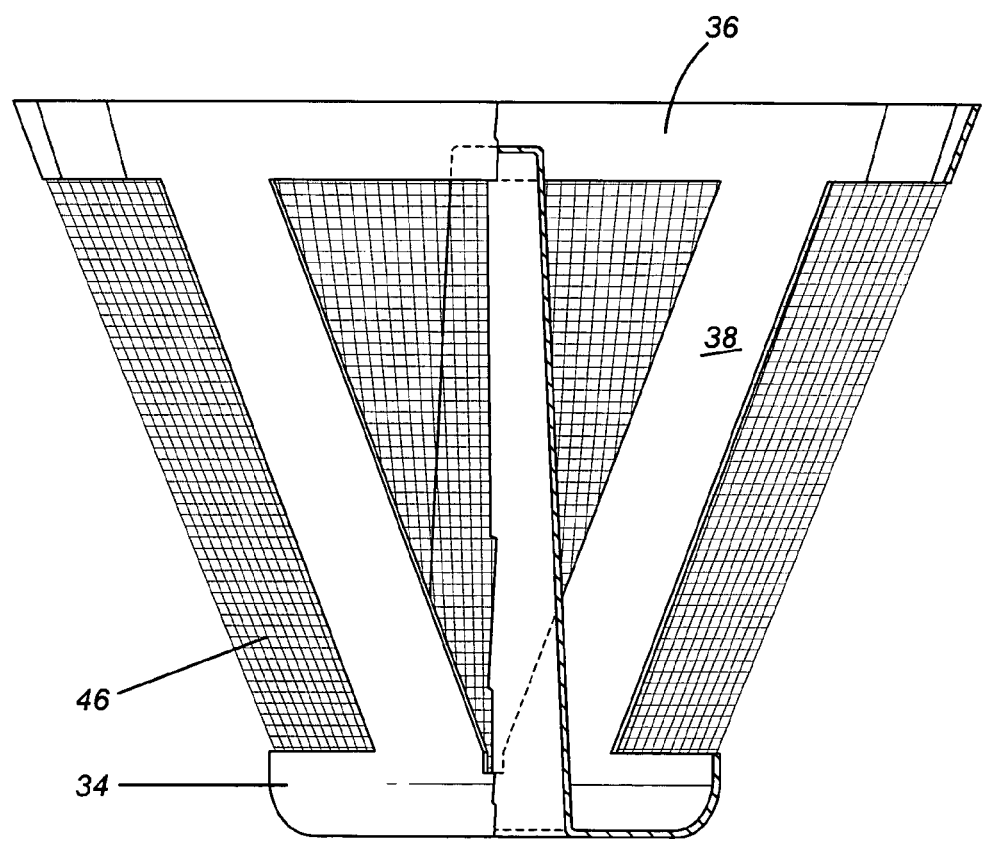
FIG. 8 is a cross sectional view taken along the lines 8-8 of FIG. 5.

In the embodiment of FIG. 4, the beverage filter generally designated by reference numeral 30 has a configuration designed to fit conical brewing machines. In this embodiment, there is again provided a base 32. Extending upwardly from base 32 is a lower wall 34 which has an overall hexagonal shape.

An upper wall 36 is connected to lower wall 34 by means of ribs 38. As will be noted, upper wall 36 has a pair of undulated sections 40 and 42 such that it can again be sized to fit within machines having different brewing capacities while the balance of upper wall 36 is of a non undulated configuration. As in the previously described embodiment, a handle 44 extends upwardly from base 32 to permit easy removal of the filter. A mesh or sieve 46 is formed of metallic strands.

It will be understood that the above described embodiments are for purposes of illustration only and that changes and modifications may be made thereto without departing from the spirit and scope of the invention.

I claim:

1. A reusable beverage filter comprising:
   a base;
   an upper wall section of a solid material, said upper wall section having at least one flexible portion, said flexible portion having a plurality of undulations formed therein;
   a lower wall section formed of a solid material;
   a plurality of ribs extending between said upper and lower wall sections; and
   sieve portions extending between said upper wall section, said lower wall section and said ribs, said sieve having undulations in portions secured to said flexible portion of said upper wall section having undulations formed therein.

2. The reusable beverage filter of claim 1 wherein there are provided a plurality of flexible portions in said upper wall section, each of said flexible portions having a plurality of undulations formed therein, and a plurality of upper wall sections having a non undulated configuration.

3. The reusable beverage filter of claim 1 wherein said filter has a conical configuration.

4. The beverage filter of claim 3 wherein said sieve portions are composed of a plurality of wires.

5. The reusable beverage filter of claim 4 wherein said wires have a wire count of between 140 to 170 wires per inch.

6. The reusable beverage filter of claim 5 wherein said wires are formed of a metallic material.

7. The reusable beverage filter of claim 1 further including a center post extending upwardly from said base interiorly of said sieve.

8. The reusable beverage filter of claim 1 wherein said upper wall section has undulations formed throughout its length.

9. The reusable beverage filter of claim 7 wherein said base has a solid central portion, a plurality of ribs extending from said solid central portion to said lower wall section, and sieve sections intermediate said ribs.

* * * * *